United States Patent
Nakamura et al.

(10) Patent No.: US 7,013,741 B2
(45) Date of Patent: Mar. 21, 2006

(54) TORQUE SENSOR

(75) Inventors: Yoshito Nakamura, Wako (JP); Yasuo Shimizu, Wako (JP); Shunichiro Sueyoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/796,452

(22) Filed: Mar. 9, 2004

(65) Prior Publication Data

US 2004/0194559 A1 Oct. 7, 2004

(30) Foreign Application Priority Data

Apr. 2, 2003 (JP) .............................. 2003-099635

(51) Int. Cl.
*G01L 3/02* (2006.01)
(52) U.S. Cl. ................................... 73/862.33
(58) Field of Classification Search .......... 73/862.331, 73/862.332, 862.333, 862.335
See application file for complete search history.

(56) References Cited

U.S. PATENT DOCUMENTS

| 4,364,005 A | * | 12/1982 | Kohzai et al. ............... 322/31 |
| 4,803,885 A | * | 2/1989 | Nonomura et al. ..... 73/862.333 |
| 4,817,444 A | * | 4/1989 | Yagi et al. ............. 73/862.335 |
| 4,876,899 A | * | 10/1989 | Strott et al. ............ 73/862.31 |
| 5,351,555 A | * | 10/1994 | Garshelis ............... 73/862.335 |
| 5,578,918 A | * | 11/1996 | Baatz ......................... 324/146 |
| 5,889,215 A | * | 3/1999 | Kilmartin et al. ....... 73/862.335 |
| 6,163,148 A | * | 12/2000 | Takada et al. .............. 324/226 |
| 6,341,535 B1 | * | 1/2002 | Yasui ..................... 73/862.333 |
| 6,484,592 B1 | * | 11/2002 | Sezaki ................... 73/862.335 |
| 6,574,853 B1 | * | 6/2003 | Shinoura ................... 29/602.1 |
| 6,823,745 B1 | * | 11/2004 | Goto et al. ............ 73/862.331 |

FOREIGN PATENT DOCUMENTS

| EP | 0 444 575 A | 9/1991 |
| JP | 02 154130 | 6/1990 |
| JP | 02 195220 A | 8/1990 |
| JP | 09 043070 | 2/1997 |
| JP | 2001-133337 | 5/2001 |
| JP | 2001-168706 | 6/2001 |
| JP | 2001-296193 | 10/2001 |

* cited by examiner

Primary Examiner—Max Noori
(74) Attorney, Agent, or Firm—Hamre, Schumann, Mueller & Larson, P.C.

(57) ABSTRACT

A magnetostriction-type torque sensor 20 includes a shaft 12*b* formed of a magnetic material and provided with at least magnetostrictive films 20*b* and 20*c*; exciting coils 20*d'* and 20*e'* for exciting the magnetostrictive films 20*b* and 20*c* provided on the shaft 12*b*; detection coils 20*d* and 20*e* for detecting a change in a magnetic field; and yoke portions 20*f* respectively provided around outer peripheries of the exciting coils 20*d'* and 20*e'* and the detection coils 20*d* and 20*e*, wherein a magnetic shield section 20*a* formed of a magnetic material is provided around the outer peripheries of the yoke portions 20*f*.

5 Claims, 7 Drawing Sheets

TORQUE SENSOR

BACKGROUND OF THE INVENTION

The present invention relates to a torque sensor, and more particularly to a torque sensor for an electric power steering apparatus for alleviating the steering torque of a driver by causing the power of a motor to be directly applied to a steering system.

An electric power steering apparatus has a motor in a steering system, and alleviates the steering torque of the driver by controlling the power supplied from the motor by using a controller. A conventional electric power steering apparatus has a steering torque detecting unit (torque sensor) provided in a steering gearbox for detecting a steering torque applied to a steering shaft coupled to a steering wheel. Its detected value is inputted to the controller, and is supplied as a reference signal for allowing the motor to generate an appropriate assist steering torque.

As the above-described steering torque detecting unit, a magnetostriction type is known in addition to a torsion bar type which makes use of the torsion of a torsion bar provided between input and output shafts of a pinion. As one example of the magnetostriction-type torque detecting unit, magnetostrictive films of such as Ni—Fe platings are provided with predetermined axial widths on the surface of the steering shaft coupled to the steering wheel, in such a manner as to assume magnetic anisotropies of mutually opposite directions at two upper and lower portions. When the steering torque is applied to the magnetostrictive films, an inverse magnetostriction characteristic occurring on the basis of the magnetic anisotropies is detected by making use of ac resistances or the like of coils disposed around the magnetostrictive films. Such torque sensors are disclosed in patent document 1 and patent document 2.

Figure 6:
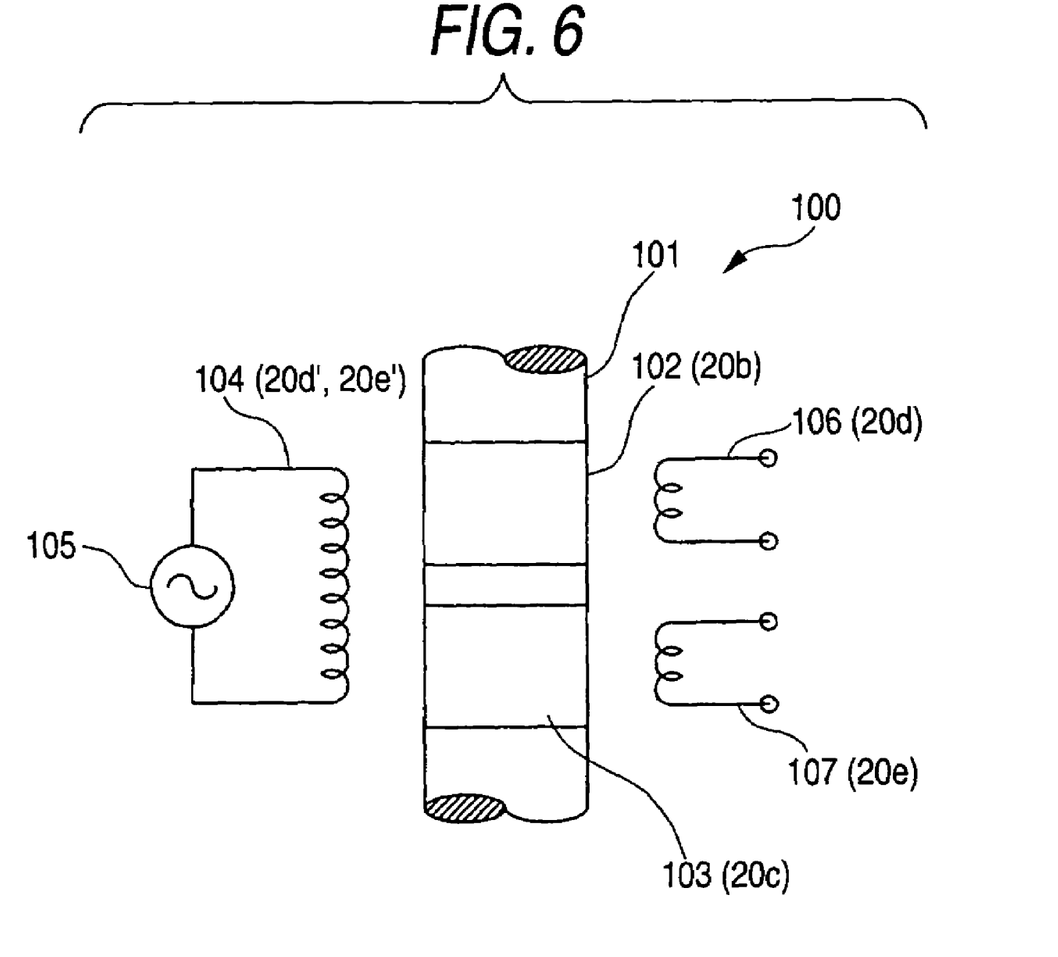
FIG. 6 is a schematic diagram of the relationship of layout among an exciting coil, detection coils, and magnetostrictive films in the torque sensor.

FIG. 6 is a schematic diagram of the relationship of layout among the exciting coil, the detection coils, and the magnetostrictive films in a torque sensor 100 such as the one described above. A magnetostrictive film 102 is formed on the surface of a steering shaft 101, and a magnetostrictive film 103 is formed thereon at an interval with the magnetostrictive film 102. An exciting coil 104 is disposed in the vicinity of these magnetostrictive films with a very small gap provided between the exciting coil 104 and the magnetostrictive films. An exciting-voltage supply source 105 is connected to the exciting coil 104. Further, a detection coil 106 is disposed in the vicinity of the magnetostrictive film 102 with a very small gap provided therebetween, while a detection coil 107 is disposed in the vicinity of the magnetostrictive film 103 with a very small gap provided therebetween.

In the torque sensor 100 shown in FIG. 6, when torque is applied to the steering shaft 101, the torque is also applied to the magnetostrictive films 102 and 103. The inverse magnetostrictive effect occurs in the magnetostrictive films 102 and 103 in correspondence with this torque. For this reason, when a high-frequency ac voltage (exciting voltage) is supplied from the exciting-voltage supply source 105 to the exciting coil 104, a change in the magnetic field due to the inverse magnetostrictive effect of the magnetostrictive films 102 and 103 based on the torque can be detected by the detection coils 106 and 107 as a change in impedance or induced voltage. From this change in impedance or induced voltage, it is possible to detect the torque applied to the steering shaft 101.

Figure 7:
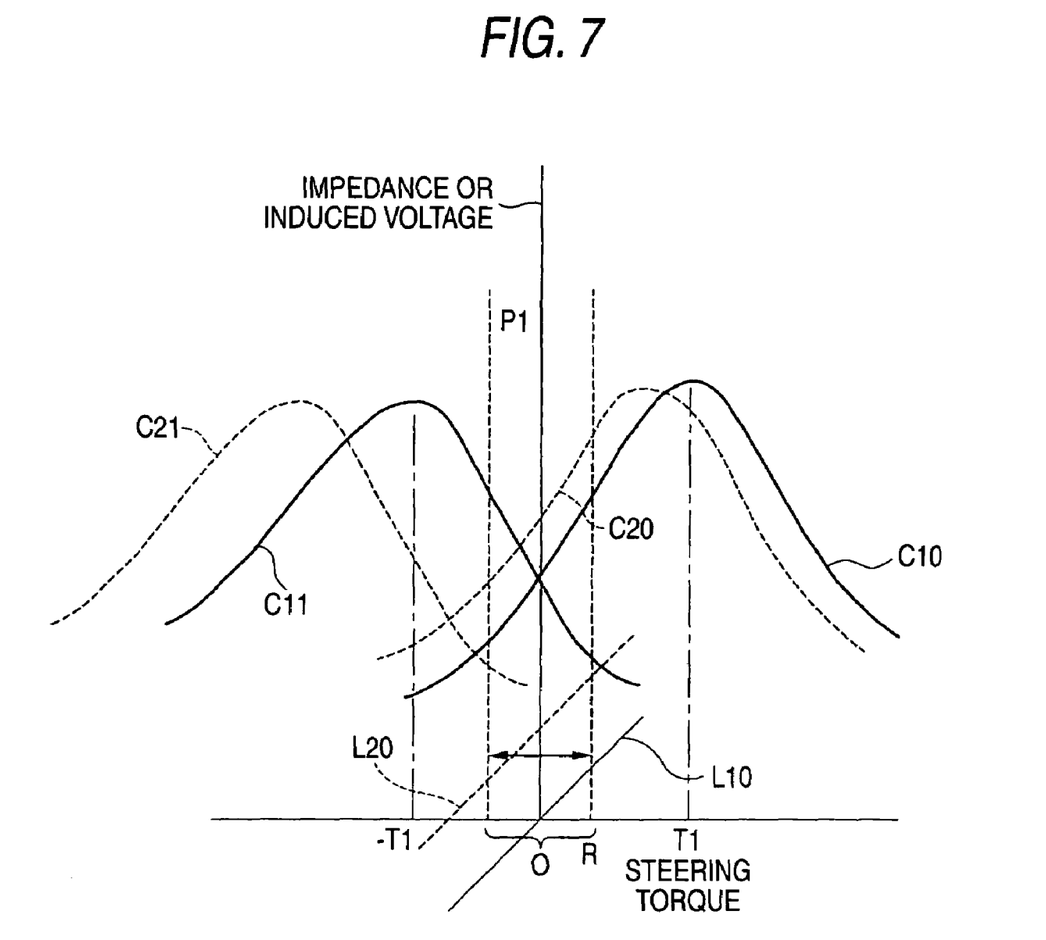
FIG. 7 is a graph illustrating one example of an inverse magnetostriction characteristic.

One example of such an inverse magnetostrictive characteristic is shown in FIG. 7. In FIG. 7, the abscissa shows the steering input torque, while the ordinate shows the impedance or induced voltage detected by the detection coils when an ac voltage is applied to the exciting coil. A curve C10 shows the change in impedance or induced voltage detected by the detection coil 106 when an external magnetic field is absent, while a curve C11 shows the change in impedance or induced voltage detected by the detection coil 107 when an external magnetic field is absent. In the detection by the detection coil 106, the impedance or induced voltage increases as the steering torque changes from negative to positive, and the impedance or induced voltage assumes a peak value P1 when the steering torque has assumed a positive value T1, while it decreases when the steering torque is more than T1. On the other hand, in the detection by the detection coil 107, the impedance or induced voltage increases as the steering torque changes from positive to negative, and the impedance or induced voltage assumes the peak value P1 when the steering torque has assumed a negative value −T1, while it decreases when the steering torque is increased. As shown in FIG. 7, the steering torque-impedance (induced voltage) characteristic obtained by the detection coil 106 and the steering torque-impedance. (induced voltage) characteristic obtained by the detection coil 107 show substantially convex shapes. The steering torque-impedance (induced voltage) characteristic obtained by the detection coil 106 and the steering torque-impedance. (induced voltage) characteristic obtained by the detection coil 107 become substantially symmetrical about the axis of ordinates by reflecting the magnetic anisotropies which assume mutually opposite directions at the two upper and lower magnetostrictive films mentioned earlier. In addition, a straight line L10 shows a value in which the characteristic curve C11 detected by the detection coil 107 is subtracted from the characteristic curve C10 detected by the detection coil 106. The straight line L10 shows that its value becomes zero when the steering torque is zero, and that its value changes substantially linearly with respect to the change in the steering torque in the range R of the steering torque. The magnetostriction-type torque detecting unit outputs a detection signal corresponding to the direction and magnitude of the input torque by using a region which is considered to exhibit a substantially fixed gradient particularly in the vicinity of a torque neutral point among such characteristic curves C10 and C11. In addition, by using the characteristic of the straight line L10, it is possible to detect the steering torque from the values of the detection coils 106 and 107.

Next, a description will be given of a case where an external magnetic field is present in such a torque sensor. When the external magnetic field is present, the magnetic properties of the system including the magnetostrictive films 102 and 103 and the steering system formed of a magnetic material undergo a change. As a result, as shown in FIG. 7, the characteristic curve obtained by the detection coil 106 and the characteristic curve obtained by the detection coil 107 shift as shown by a dotted line C20 and a dotted line C21, respectively. Consequently, a straight line obtained by the difference between the characteristic curves C21 and C22 also shifts as shown by a dotted line L20, and assumes a value which is not zero even when the steering torque is zero, resulting in the occurrence of a so-called midpoint offset. In the case of the electric power steering apparatus, the midpoint offset of the output of the torque sensor constitutes a left-right difference in the steering assist force, and imparts an uneasy feeling to the driver who performs the steering. Therefore, it is necessary to perform zero point correction, i.e., neutral point adjustment, in order to obtain the steering torque from the detected values of the detection coils 106 and 107. For this reason, the neutral point adjustment is normally essential after the installation of the torque sensor on the electric power steering apparatus.

However, with the conventional steering torque detecting unit, since no special magnetic shield section is provided, if a change in the external environment before and after the installation of the torque detecting unit in the vehicle is taken into consideration, there is a problem in that it is, difficult to perform the neutral point adjustment of the torque detection signal by the torque detecting unit as a single unit. Namely, if the magnetic field of the vicinity of the torque detecting unit changes due to the approach of a magnet or the like from the outside after the neutral point adjustment of the torque detection signal is effected as a single unit and the torque detecting unit is installed in the vehicle, the neutral point of the torque detection signal changes. For example, since the characteristic of the steering torque when steering without driving is effected differs according to the rotating direction of the steering wheel, the neutral point of the torque detection signal must be readjusted. Accordingly, patent document 3 proposes a structure in which a magnetic shield is provided in the vicinity of the magnetostrictive films of the torque sensor.

[Patent Document 1]
   JP-A-2001-133337

[Patent Document 2]
   JP-A-2002-168706

[Patent Document 3]
   JP-A-2001-296193

However, in the magnetic shield section disclosed in patent document 3, although a magnetic shield is provided for only the surroundings of the magnetostrictive films by a casing of a nonmagnetic highly electrically conductive material, the effect of an external magnetic field is exerted on not only the magnetostrictive films but the steering shaft formed of a magnetic material, so that the steering shaft is magnetized by the external magnetic field. Because the steering shaft is magnetized, there arises the problem that the characteristic of the torque sensor changes. For this reason, if the magnetic shield is provided only for the surroundings of the magnetostrictive films, there is a problem in that it is difficult to suppress the effect of the external magnetic field on the torque sensor.

SUMMARY OF THE INVENTION

An object of the invention is to provide a torque sensor in which the neutral point of the torque detection signal does not change even if the magnetic field in the surroundings of the torque sensor changes due to the approach of a magnet or the like from the outside, and which therefore facilitates the adjustment of the neutral point, thereby overcoming the above-described problems.

To attain the above object, the torque sensor in accordance with the invention is constructed as described below.

A first torque sensor (corresponding to claim 1) is a magnetostriction-type torque sensor characterized by including: a shaft formed of a magnetic material and provided with at least a magnetostrictive film; an exciting coil for exciting the magnetostrictive film provided on the shaft; a detection coil for detecting a change in a magnetic field; and yoke portions respectively provided around outer peripheries of the exciting coil and the detection coil, wherein magnetic shield section formed of a magnetic material is provided around the outer periphery of the yoke portion.

According to the first torque sensor, since the magnetic shield section formed of a magnetic material is provided around the outer periphery of the yoke portion. Therefore, as the shield section formed of the magnetic material is provided in such a manner as to surround a steering torque detecting unit (torque sensor), even if the external magnetic field in the vicinity of the torque sensor mounted in the vehicle changes due to, for instance, a magnet or the like disposed on the outside, it is possible to suppress a change in the neutral point of a torque detection signal. In addition, use is made of the inverse magnetostriction effect of a magnetostrictive material exhibiting a magnetic anisotropy; hence, the shield section is used for the magnetostriction-type torque detecting section susceptible to the effect of a change in the external magnetic field. Therefore, it becomes unnecessary to readjust the neutral point of the torque detection signal, and the neutral point adjustment by the torque detecting unit as a single unit is made possible.

A second torque sensor (corresponding to claim 2) is characterized in that in the above-described construction the magnetic shield section is preferably formed of a magnetic material exhibiting a low coercive force characteristic.

According to the second torque sensor, since the magnetic shield section is formed of a magnetic material exhibiting a low coercive force characteristic, it is possible to suppress the magnetization of the shield section by an external magnetic field. Therefore, it is possible to minimize the effect on the torque detecting section due to the magnetization of the shield section after an object constituting a cause of the change in the external magnetic field is removed.

A third torque sensor (corresponding to claim 3) is characterized in that in the above-described construction a predetermined distance is preferably provided between the magnetic shield section and the yoke portion.

According to the third torque sensor, since a predetermined distance is provided between the magnetic shield section and the yoke portion, it is possible to sufficiently weaken the effect exerted on the torque detecting unit by the external magnetic field. Therefore, it becomes unnecessary to readjust the neutral point of the torque detection signal, and the neutral point adjustment by the torque detecting unit as a single unit is made possible.

A fourth torque sensor (corresponding to claim 4) is characterized in that in the above-described construction the magnetic shield section is preferably disposed parallel to the shaft so as to uniformly impart a magnetic effect from an outside world to the shaft.

According to the fourth torque sensor, since the magnetic shield section is disposed parallel to the shaft so as to uniformly impart a magnetic effect from the outside world to the shaft, across section of the shield section along the center line of the torque input shaft is made substantially parallel to the center line of the torque input shaft. As a result, the effect exerted on the torque detecting unit by the external magnetic field can be made uniform with respect to the axial direction. Therefore, it becomes unnecessary to readjust the neutral point of the torque detection signal, and the neutral point adjustment by the torque detecting unit as a single unit is made possible.

A fifth torque sensor (corresponding to claim 5) is characterized in that in the above-described construction the torque sensor is preferably mounted as a sensor for detecting a torque occurring in a steering system of a vehicle having an electric power steering apparatus.

According to the fifth torque sensor, since the torque sensor is mounted as a sensor for detecting the torque occurring in the steering system of the vehicle having the electric power steering apparatus, when the torque sensor is incorporated in the electric power steering apparatus, it is possible to reduce uneasy steering feel by virtue of the suppression of a midpoint offset of the torque sensor output, or attain stabilization of the steering feeling.

BRIEF DESCRIPTION OF THE DRAWINGS

FIGS. 4A and 4B are diagrams illustrating states in which the magnetic field in the vicinity of a torque detecting unit changes due to the approach of a magnet or the like, in which FIG. 4A shows a case in which a magnetic shield member is not provided, and FIG. 4B shows a case in which the magnetic shield member is provided;

FIGS. 5A to 5C are diagrams illustrating modifications of the magnetic shield section, in which FIG. 5A shows a structure in which the magnetic shield section is embedded inside a holding member of a torque sensor, FIG. 5B shows a case in which the holding member itself is constructed by using such a material as satisfies the functions described in the invention, and FIG. 5C shows a case in which a cover member covering an entire torques detecting section is constructed by using such a material as satisfies the functions described in the invention;

DETAILED DESCRIPTION OF THE PREFERRED EMBODIMENTS

Hereafter, a description will be given of a preferred embodiment of the invention with reference to the accompanying drawings.

Figure 1:
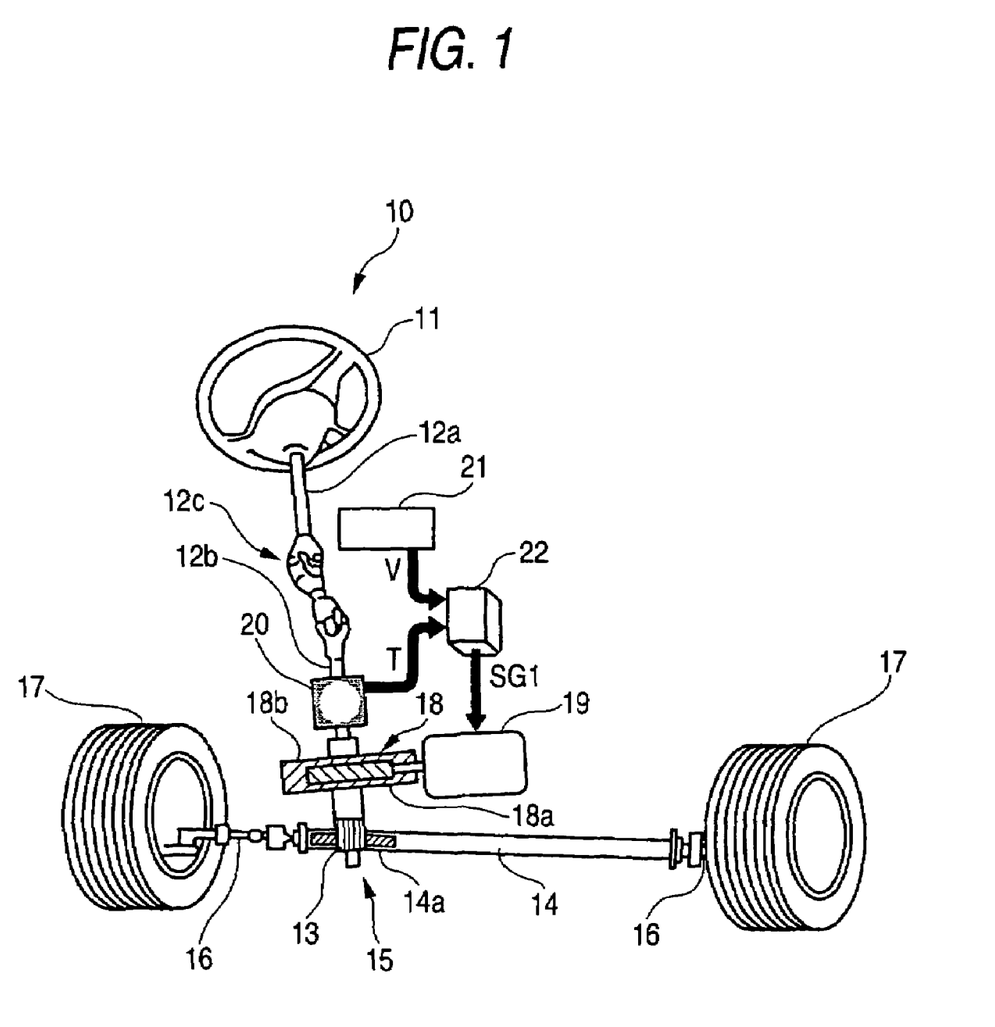
FIG. 1 is an overall schematic diagram of an electric power steering apparatus in accordance with an embodiment of the invention.

FIG. 1 is an overall schematic diagram of an electric power steering apparatus in accordance with an embodiment of the invention. An electric power steering apparatus 10 is arranged to impart an assisting steering force (steering torque) to a steering shaft 12a and the like coupled to a steering wheel 11. The steering shaft 12a is coupled to a steering shaft 12b through a universal joint 12c, and an upper end of the steering shaft 12a is connected to the steering wheel 11, a pinion gear 13 being provided on a lower end of the steering shaft 12b. A rack shaft 14 provided with a rack gear 14a meshing with the pinion gear 13 is disposed with respect to the pinion gear 13. A rack and pinion mechanism 15 is formed by the pinion gear 13 and the rack gear 14a. Tie rods 16 are respectively provided at both ends of the rack shaft 14, and front wheels 17 are respectively fitted to outer ends of the tie rods 16. A motor 19 is provided for the aforementioned steering shaft 12b through a power transmission mechanism 18. The power transmission mechanism 18 is formed by a worm gear 18a and a worm wheel 18b. The motor 19 outputs a rotating force (torque) for assisting the steering torque, and this rotating force is imparted to the steering shafts 12b and 12a through the power transmission mechanism 18. In addition, the steering shaft 12b is provided with a steering torque detecting unit (torque sensor) 20. The steering torque detecting unit 20 detects the steering torque applied to the steering shafts 12a and 12b when the steering torque which occurs by the operation of the steering wheel 11 by a driver is applied to the steering shafts 12a and 12b. Reference numeral 21 denotes a vehicle speed detecting unit for detecting the speed of the vehicle, and reference numeral 22 denotes a controller constituted by a computer. The controller 22 fetches a steering torque signal T outputted from the steering torque detecting unit 20 and a vehicle speed signal V outputted from the vehicle speed detecting unit 21, and outputs a drive controlling signal SG1 for controlling the rotating operation of the motor 19 on the basis of information on the steering torque and information on the vehicle speed. The aforementioned rack and pinion mechanism 15 and the like are accommodated in an unillustrated gear box 24 in FIG. 1.

In the above-described arrangement, the electric power steering apparatus 10 is constructed by adding the steering torque detecting unit 20, the vehicle speed detecting unit 21, the controller 22, the motor 19, and the power transmission mechanism 18 to the system configuration of an ordinary steering system.

In the above-described construction, when the driver steers the driving direction during the traveling and driving of the vehicle by operating the steering wheel 11, the rotating force based on the steering torque applied to the steering shafts 12a and 12b is converted to linear motion in the axial direction of the rack shaft 14 through the rack and pinion mechanism 15, and further tends to change the traveling direction of the front wheels 17 through the tie rods 16. At this time, the steering torque detecting unit 20 provided at the steering shaft 12b concurrently detects the steering torque corresponding to the steering by the driver using the steering wheel 11, converts it to the electric steering torque signal T, and outputs this steering torque signal T to the controller 22. Meanwhile, the vehicle speed detecting unit 21 detects the speed of the vehicle, converts it to the vehicle speed signal V, and outputs this vehicle speed signal V to the controller 22. The controller 22 generates a motor current for driving the motor 19 on the basis of the steering torque signal T and the vehicle speed signal V. The motor 19 which is driven by the motor current causes an assisting steering force to be applied to the steering shafts 12b and 12a through the power transmission mechanism 18. By driving the motor 19 in the above-described manner, the steering force applied to the steering wheel 11 by the driver is alleviated.

Figure 2:
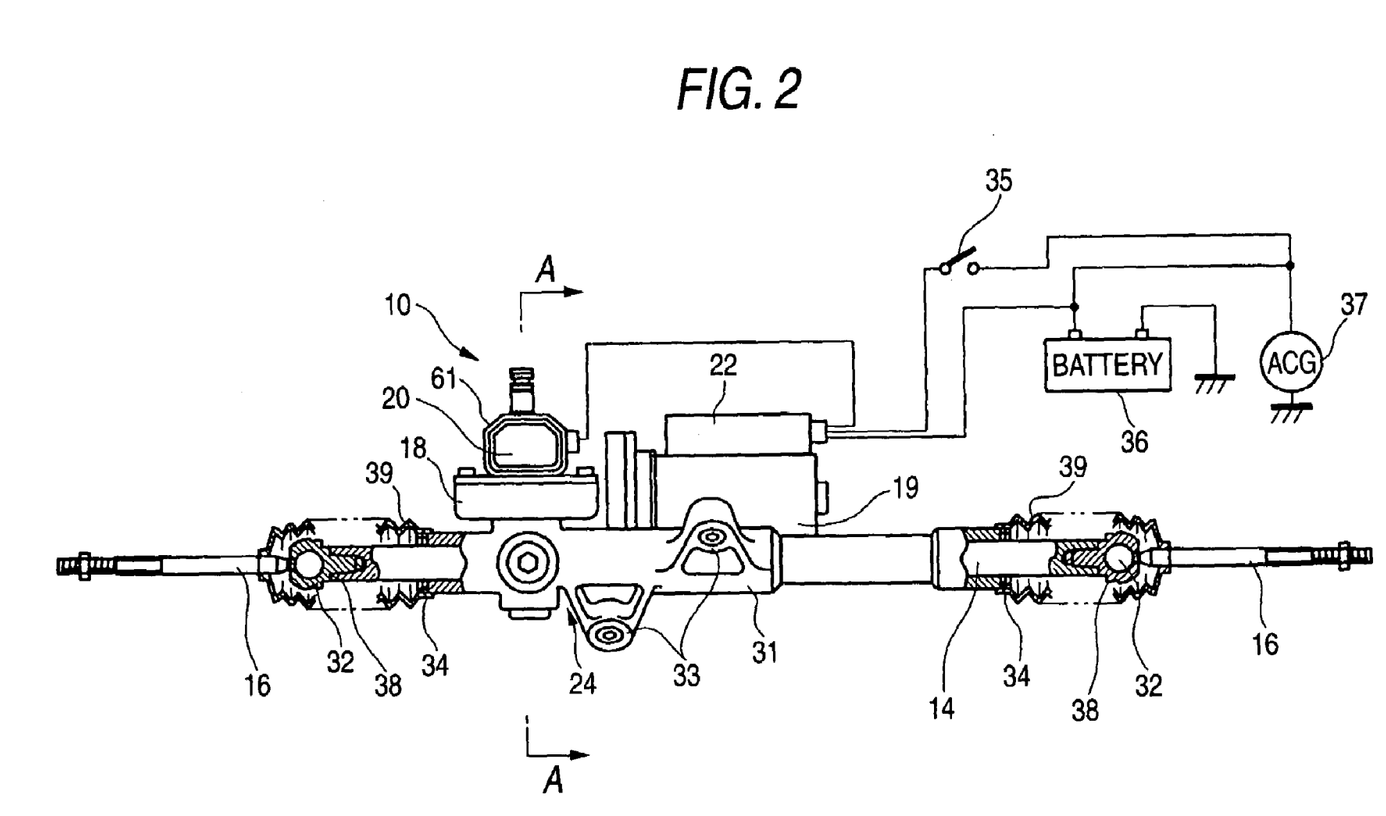
FIG. 2 is a diagram illustrating a specific configuration of essential portions of a mechanical mechanism of the electric power steering apparatus 10 and an electric system.

FIG. 2 shows a specific configuration of essential portions of the mechanical mechanism of the electric power steering apparatus 10 and an electric system. Portions of a left end portion and a right end portion of the rack shaft 14 are shown in section. The rack shaft 14 is accommodated axially slidably inside a tubular housing 31 arranged in the widthwise direction of the vehicle (in the left-and-right direction in FIG. 2). Ball joints 32 are respectively screwed to both ends of the rack shaft 14 projecting from the housing 31, and the left and right tie rods 16 are respectively connected to these ball joints 32. The housing 31 has brackets 33 for installation on the unillustrated vehicle body, and has stoppers 34 at its both end portions.

In FIG. 2, reference numeral 35 denotes an ignition switch; 36, a vehicle-mounted battery; and 37, an ac generator (ACG) attached to a vehicle engine. The ac generator 37 starts power generation by the operation of the vehicle engine. Necessary electric power is supplied to the controller 22 from the battery 36 or the ac generator 37. The controller 22 is attached to the motor 19. In addition, reference numeral 38 denotes a rack end which abuts against the stopper 34 at the time of the movement of the rack shaft, and numeral 39 denotes a dust sealing boot for protecting the interior of the gear box from water, mud, dust, and the like.

Figure 3:
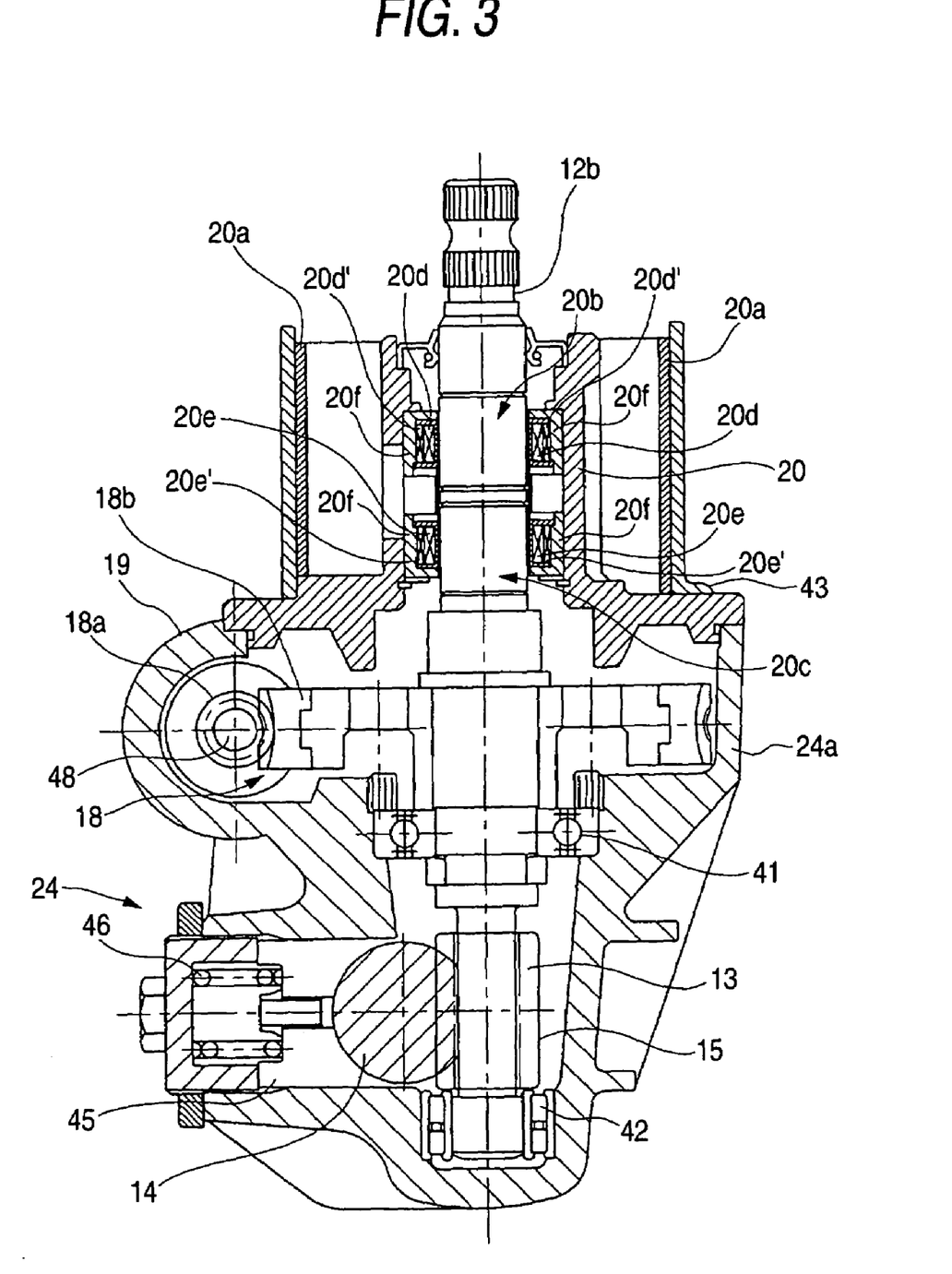
FIG. 3 is a cross-sectional view taken along line A—A in FIG. 2.

FIG. 3 is a cross-sectional view taken along line A—A in FIG. 2. FIG. 3 clearly shows a specific configuration of the supporting structure of the steering shaft 12b, the steering torque detecting unit 20, the power transmission mechanism 18, and the rack and pinion mechanism 15.

In FIG. 3, the steering shaft 12b is rotatably supported by two bearing portions 41 and 42 in a housing 24a which forms the gear box 24. The rack and pinion mechanism 15 and the power transmission mechanism 18 are accommodated inside the housing 24a, and the steering torque detecting unit (torque sensor) 29 is attached to an upper portion thereof. Further, a hollow cylindrical magnetic shield member 20a surrounds the steering shaft 12b and yoke portions 20f which surround coils 20d, 20d', 20e, and 20e' around magnetostrictive films 20b and 20c in such a manner as to cover the periphery of the steering torque detecting unit 20. An upper opening of the housing 24a is closed by a lid 43, and the lid 43 is fixed by bolts. The pinion 13 provided at a lower end portion of the steering shaft 12b is located between the bearing portions 41 and 42. The rack shaft 14 is guided by a rack guide 45, and is urged by a compressed spring 46 so as to be pressed toward the pinion 13 side. The power transmission mechanism 18 is formed by the worm gear 18a fixed to a transmission shaft 48 coupled to an output shaft of the motor 19 as well as the worm wheel 18b fixed to the steering shaft 12b. The steering torque detecting unit 20 is fitted to the lid 43.

As described above, the torque sensor 20 is provided in the steering gear box 24 and detects the steering torque applied to the steering shaft 12b. Its detected value is inputted to the controller 22, and is supplied as a reference signal for allowing the motor 19 to generate an appropriate auxiliary steering torque.

The torque sensor 20 used herein is a magnetostriction-type sensor, and is arranged such that, as shown in FIG. 3, magnetostrictive films exhibiting magnetic anisotropies such as Ni—Fe platings are provided with predetermined axial widths on the surface of the steering shaft 12b coupled to the steering wheel 11 via the steering shaft 12a and the universal joint 12c, in such a manner as to assume magnetic anisotropies of mutually opposite directions at two upper and lower portions (20b and 20c). By making use of ac resistances or the like of the coils 20d and 20e disposed around the magnetostrictive films 20b and 20c, the torque sensor 20 detects an inverse magnetostriction characteristic occurring when the steering torque is applied to the magnetostrictive films 20b and 20c.

Next, a detailed description will be given of the torque sensor of the invention. As shown in FIG. 3, the torque sensor of the invention has the magnetostrictive films 20b and 20c provided at two peripheral portions of the steering shaft (shaft) 12b formed of a magnetic material, and has coils including the exciting coils 20d' and 20e' for exciting the magnetostrictive films 20b and 20c provided on the steering shaft 12b, as well as the detection coils 20d and 20e for detecting a change in the magnetic field. In addition, the yoke portions 20f are provided around the outer peripheries of the exciting coils 20d' and 20e' and the detection coils 20d and 20e. The magnetic shield member 20a formed of a hollow cylindrical magnetic material is provided around the outer peripheries of the yoke portions 20f. The magnetic shield member 20a is preferably provided over the entire axial length of the steering shaft, or in such a manner as to cover the portion of the steering shaft which is exposed to the outside.

The magnetic shield member 20a is formed of a material exhibiting a low coercive force characteristic, e.g., a silicon steel sheet of 50A600–50A1300 (according to JIS C 2552). Here, the numerical value "50" is a value in which the nominal thickness (mm) is made 100-fold, and the code "A" indicates a non-oriented material, i.e., a material whose permeability is substantially fixed irrespective of the rolling direction. In addition, the numerical value "600" or "1300" is a value in which 1 (kg) equivalent weight (W/kg) of the iron loss is made 100-fold. In addition, a predetermined distance is provided between the magnetic shield member 20a and each yoke portion 20f. The predetermined distance is, for example, such a distance that the inner radius of the hollow cylindrical magnetic shield member is set to at least about two times the outer diameter of the magnetostrictive film portion of the steering shaft. The reason is that if the predetermined distance is less than this distance, the magnetic flux which is to be blocked by the magnetic shield member leaks to the yoke member on the inner side. The magnetic shield member 20a is disposed parallel to the steering shaft 12b, with the result that the magnetic shield member 20a is arranged to uniformly impart the magnetic effect from the outside world on the steering shaft 12b.

The relationship among the exciting coils 20d' and 20e', the detection coils 20d and 20e, and the magnetostrictive films, if expressed schematically, assumes a configuration similar to that of FIG. 6. In addition, since the magnetic shield member 20a is present, the characteristics which are detected by the detection coils 20d and 20e become similar to those of the curves C10 and C11 shown in. FIG. 7 regardless of whether an external magnetic field is present or absent. Thus, as shown in FIG. 7, the steering torque-impedance (induced voltage) characteristic obtained by the detection coil 20d and the steering torque-impedance (induced voltage) characteristic obtained by the detection coil 20e show substantially convex shapes. The steering torque-impedance (induced voltage) characteristic obtained by the detection coil 20d and the steering torque-impedance (induced voltage) characteristic obtained by the detection coil 20e become substantially symmetrical about the axis of ordinates by reflecting the magnetic anisotropies which assume mutually opposite directions at the two upper and lower magnetostrictive films mentioned earlier. In addition, a value ha in which the characteristic curve detected by the detection coil 20e is subtracted from the characteristic curve detected by the detection coil 20d becomes similar to the straight line L10. The straight line L10 shows that its value becomes zero when the steering torque is zero, and that its value changes substantially linearly with respect to the change in the steering torque in the range R of the steering torque. Since the torque sensor in accordance with the invention is provided with the magnetic shield member, regardless of whether the external magnetic field is present or absent, the magnetostriction type torque detecting unit outputs a detection signal corresponding to the direction and magnitude of the input torque by using a region which is considered to exhibit a substantially fixed gradient particularly in the vicinity of a torque neutral point among characteristic curves similar to such characteristic curves C10 and C11. In addition, by using a characteristic similar to that of the straight line L10, it is possible to detect the steering torque from the values of the detection coils 20*d* and 20*e*.

Figure 4A:
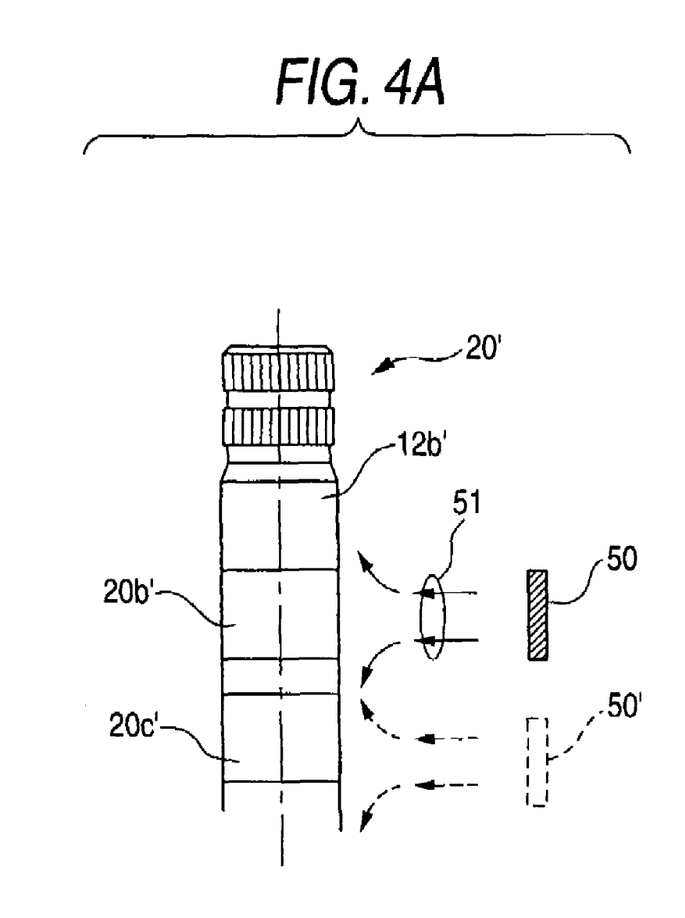
Figure 4B:
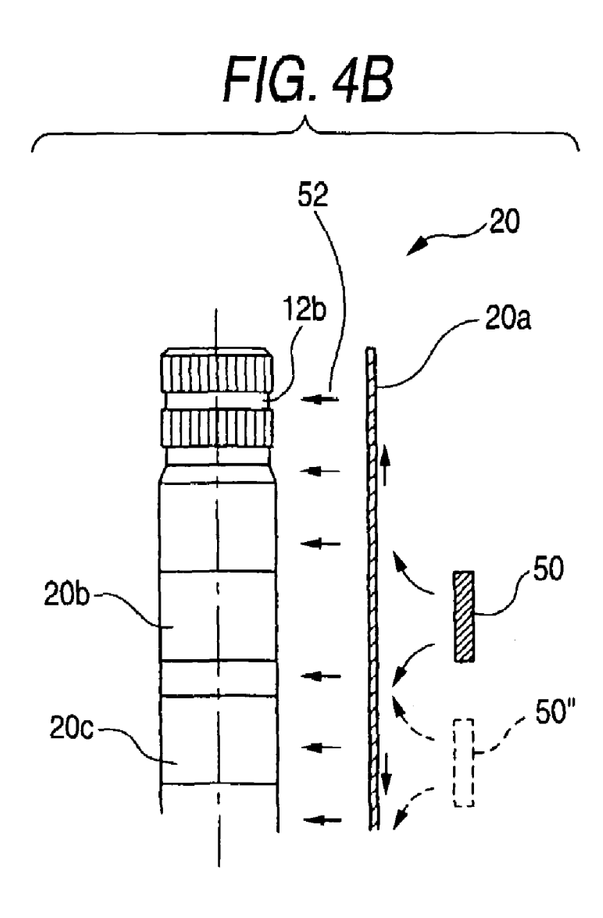

Next, a description will be given of a state in which an external magnetic field is imparted to a torque sensor 20' which is not provided with the magnetic shield member 20*a*, as well as the effect when the external magnetic field is imparted to the torque sensor 20 which is provided with the magnetic shield member 20*a* as in the invention. FIG. 4A is a diagram illustrating a state in which an external magnetic field is imparted to the torque sensor 20' which is not provided with the magnetic shield member. FIG. 4B is a diagram illustrating the effect when the external magnetic field is imparted to the torque sensor 20 which is provided with the magnetic shield member 20*a*.

In FIG. 4A, if a magnet 50 is present in the vicinity of the torque sensor 20', the magnetic field (arrow 51 indicates lines of magnetic force) generated by the magnet affect magnetostrictive films 20*b'* and 20*c'* of the torque sensor 20' and a steering shaft 12*b'* formed of the magnetic material. At this time, at the position of the magnet 50 in FIG. 4A, the magnetostrictive film 20*b'* is affected more strongly by the magnetic field than the magnetostrictive film 20*c'* and the upper portion of the steering shaft 12*b'* is magnetized more strongly than the lower portion thereof. For this reason, the characteristics which are detected by the unillustrated detection coil in the vicinity of the magnetostrictive film 20*b'* and the unillustrated detection coil in the vicinity of the magnetostrictive film 20*c'* do not exhibit characteristics which are symmetrical about the axis of ordinates as in the case of the curves C10 and C11 shown in FIG. 7, but exhibit characteristics as shown at the dotted lines C20 and C21 in FIG. 7. Thus the state becomes such that the torque is detected despite the fact that the input torque is zero. On the other hand, in a case where the position of the magnet 50 is such as at a dotted line 50', the magnetostrictive film 20*c'* is affected more strongly by the magnetic field than the magnetostrictive film 20*b'*, and the lower portion of the steering shaft 12*b'* is magnetized more strongly than the upper portion thereof. For this reason, the characteristics which are detected by the unillustrated detection coil in the vicinity of the magnetostrictive film 20*b'* and the unillustrated detection coil in the vicinity of the magnetostrictive film 20*c'* do not exhibit characteristics which are symmetrical about the axis of ordinates as in the case of the curves, C10 and C11 shown in FIG. 7, and exhibit characteristics which are different from those of the dotted lines C20 and C21 in FIG. 7. At this time, since the effect of the magnet 50 is exerted greatly on one magnetostrictive film as shown in FIG. 4A, the portion of offset when a change takes place from the curve C10 to the curve C20 and the portion of offset when a change takes place from the curve C11 to the curve C21 greatly differ from each other. Thus, in the case where the magnetic field in the vicinity of the torque sensor 20' has changed due to the approach of the magnet 50, 50' or the like, since the magnetic shield member is not provided, the magnetic properties of the torque sensor 20' change by being affected by the external magnetic field, and the torque detection signal also changes correspondingly. As a result of a detailed experiment and examination conducted by the present inventor concerning this phenomenon, the following fact is confirmed.

Namely, it is found that if consideration is given to the causes of change in the torque detection signal due to an external magnetic field, the major factor lies largely not in, the direct action on the magnetic properties of the magnetostrictive films 20*b'* and 20*c'* but rather in the magnetization of the surface of the torque input shaft (steering shaft) 12*b* (which will be herein referred to as a matrix) provided with the magnetostrictive films 20*b'* and 20*c'*. To give a more detailed description, when the matrix is magnetized by the effect of the external magnetic field, and internal stresses are produced in the magnetostrictive films 20*b'* and 20*c'* due to the magnetostrictive effect of the magnetostrictive materials 20*b'* and 20*c'* caused by this magnetization (i.e., due to the fact that the magnetostrictive material or its crystalline structure undergoes infinitesimal deformation owing to the magnetic field), strains corresponding to these internal stresses are produced in the magnetostrictive materials. Hence, the output changes as if an input torque is applied.

In contrast, in a case where the magnetic shield member 20*a* formed of a magnetic material is provided as shown in FIG. 4B, the magnetic shield member 20*a* is first magnetized by the effect of the external magnetic field of the magnet 50. Part of the magnetic flux (arrow 52 in the drawing) generated by that magnetization acts on the torque input shaft 12*b* inside the torque sensor 20 and magnetizes it slightly, but most of it returns to the magnet 50 or the like which is the source of the external magnetic field. Meanwhile, even if the position of the magnet is changed as indicated by 50" in FIG. 4B, in the case where the magnetic shield member 20*a* formed of a magnetic material is provided, the magnetic shield member 20*a* is similarly first magnetized by the effect of the external magnetic field of the magnet 50". Part of the magnetic flux generated by that magnetization acts on the torque input shaft 12*b* inside the torque sensor 20 and magnetizes it slightly, but most of it returns to the magnet 50" or the like which is the source of the external magnetic field. For that reason, even if the magnet 50 is at a different position as shown in FIG. 4B, the effect of the magnetic field exerted on the torque sensor is uniformly suppressed.

Thus the effect of the external magnetic field on the torque sensor 20 is alleviated by the magnetic shield member 20*a*, and a change in the torque detection signal can be sufficiently suppressed, so that it becomes unnecessary to readjust the torque detection signal.

In addition, although the magnetic material used in the magnetic shield member 20*a* has a low coercive force characteristic, the magnetic material itself is made difficult to be formed into a permanent magnet. Consequently, even in a case where an object such as a magnet which constitutes a cause of the change in the external magnetic field is removed, it becomes possible to speedily return the magnetic field in the vicinity of the torque sensor to its initial state. Hence, it is possible to minimize the period of time when the torque detection signal changes slightly.

Furthermore, the magnetic shield member is disposed at a predetermined distance with respect to the torque input shaft (steering shaft), with the result that it becomes possible to further suppress the effect of the shield section magnetized by the external magnetic field on the torque input shaft. Hence, the change in the neutral point of the torque detection signal can be suppressed more reliably even with respect to the torque sensor which is highly sensitive or susceptible to the effect of the magnetic field.

In addition, as shown in FIG. 4B, a cross section of the magnetic shield member 20*a* along the center line of the torque input shaft 12*b* is made substantially parallel to the center line of the torque input shaft 12*b*, with the result that the effect exerted on the torque input shaft by the magnetic shield member 20*a* magnetized by the external magnetic field can be made uniform with respect to the axial direction. Accordingly, in the torque sensor having magnetostrictive films of different magnetostriction characteristics between the upper and lower sides as in this embodiment, it becomes possible to cope with the problem that the torque detection signal changes due to a change in the degree of magnetization of the matrix provided with the respective magnetostrictive films.

Figure 5A:
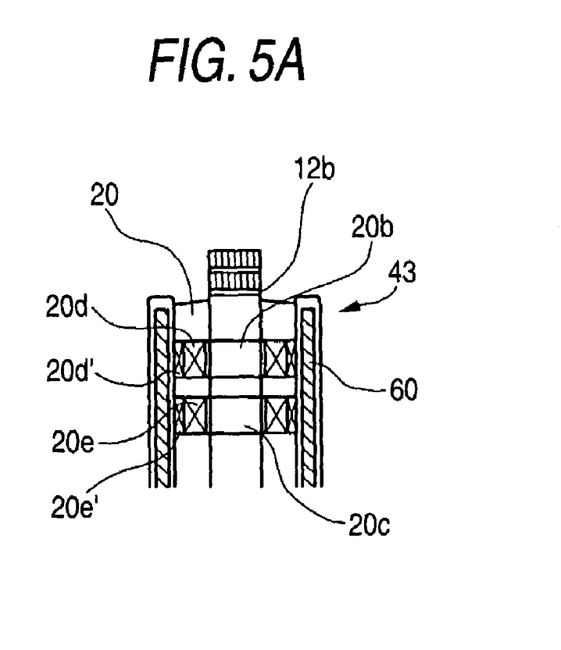
Figure 5B:
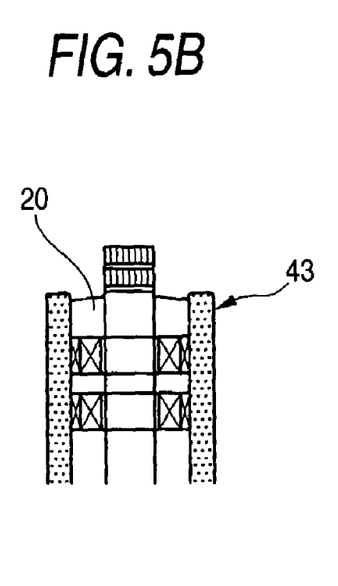
Figure 5C:
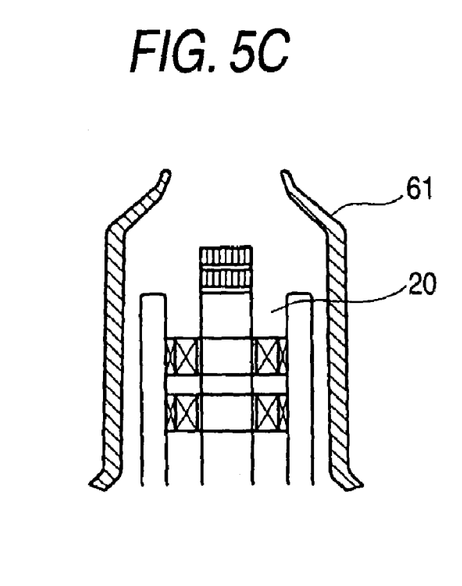

Next, modifications of the torque sensor in accordance with the invention will be shown. FIGS. 5A, 5B, and 5C are schematic diagrams illustrating modifications of the torque sensor in accordance with the invention. FIG. 5A is a diagram illustrating a first modification. Although in this embodiment the magnetic shield member is formed as a member independent from the substantially hollow cylindrical torque sensor body, the structure provided in the first modification is such that a magnetic shield member 60 is embedded inside the holding member (lid) 43 of the torque sensor 20 having the steering shaft 12b, the magnetostrictive films 20b and 20c, the coils 20d and 20d', and the coils 20e and 20e'. In this case, the effect of the external magnetic field can be suppressed by the magnetic shield member 60 inside the holding member 43.

FIG. 5B is a diagram illustrating a second modification. In the second embodiment, the holding member 43 itself of the torque sensor is constructed by using such a material as satisfies the functions described in the invention, i.e., a magnetic material having a low coercive force characteristic, e.g., a silicon steel sheet. The magnetic material is one of such as 50A600–50A1300 (according to JIS C 2552). Here, the numerical value "50" is a value in which the nominal thickness (mm) is made 100-fold, and the code "A" indicates a non-oriented material, i.e., a material whose permeability is substantially fixed irrespective of the rolling direction. In addition, the numerical value "600" or "1300" is a value in which 1 (kg) equivalent weight (W/kg) of the iron loss is made 100-fold. In this case, a magnetic shield is provided by the holding member 43, and the effect of the external magnetic field can be suppressed.

FIG. 5C is a diagram illustrating a third modification. In the third embodiment, a cover member 61 covering the entire torque sensor is constructed by using such a material as satisfies the functions described in the invention, i.e., a magnetic material having a low coercive force characteristic, e.g., a silicon steel sheet. In this case, a magnetic shield is provided by the cover member 61, and the effect of the external magnetic field can be suppressed.

It should be noted that the magnetic shield member may be provided with the function of a thermal insulation means for protecting the torque sensor from the heat generation from a high heat portion such as the engine.

As is apparent from the foregoing description, the following advantages are offered in accordance with the invention.

The magnetic shield section formed of a magnetic material is provided around the outer periphery of the yoke portion. Therefore, as the shield section formed of the magnetic material is provided in such a manner as to surround the steering torque detecting unit, even if the external magnetic field in the vicinity of the torque detecting unit mounted in the vehicle changes due to, for instance, the magnet or the like disposed on the outside, it is possible to suppress a change in the neutral point of the torque detection signal. In addition, use is made of the inverse magnetostriction effect of a magnetostrictive material exhibiting a magnetic anisotropy; hence, the shield section is used for the magnetostriction-type torque detecting section susceptible to the effect of a change in the external magnetic field. Therefore, it becomes unnecessary to readjust the neutral point of the torque detection signal, and the neutral point adjustment by the torque detecting unit as a single unit is made possible.

In addition, since the magnetic shield section is formed of a magnetic material exhibiting a low coercive force characteristic, it is possible to suppress the magnetization of the magnetic shield section by an external magnetic field. Therefore, it is possible to minimize the effect on the torque detecting section due to the magnetization of the magnetic shield section after an object constituting a cause of the change in the external magnetic field is removed.

Further, since a predetermined distance is provided between the magnetic shield section and the yoke portion, it is possible to sufficiently weaken the effect exerted on the torque detecting unit by the external magnetic field. Therefore, it becomes unnecessary to readjust the neutral point of the torque detection signal, and the neutral point adjustment by the torque detecting unit as a single unit is made possible.

In addition, since the magnetic shield section is disposed parallel to the shaft so as to uniformly impart a magnetic effect from the outside world to the shaft, a cross section of the shield section along the center line of the torque input shaft is made substantially parallel to the center line of the torque input shaft. As a result, the effect exerted on the torque detecting unit by the external magnetic field can be made uniform with respect to the axial direction. Therefore, it becomes possible to prevent a phenomenon in which the magnetic effect is produced on only either one of the magnetostrictive films, causing a change in the neutral point. Hence, it becomes unnecessary to readjust the neutral point of the torque detection signal, and the neutral point adjustment by the torque detecting unit as a single unit is made possible.

Furthermore, since the torque sensor is mounted as a sensor for detecting the torque occurring in the steering system of the vehicle having the electric power steering apparatus, when the torque sensor is incorporated in the electric power steering apparatus, it is possible to suppress a midpoint offset of the torque sensor output and attain stabilization of the steering feeling.

What is claimed is:

1. A magnetostriction-type torque sensor comprising:
   a shaft formed of a magnetic material and provided with at least magnetostrictive film;
   an exciting coil for exciting the magnetostrictive film provided on the shaft;
   a detection coil for detecting a change in a magnetic field; and
   yoke portions respectively provided around outer peripheries of the exciting coil and the detection coil;
   a magnetic shield section, formed of a magnetic material provided around the outer periphery of the yoke portion, for suppressing the effect of an external magnetic field; and
   a steering torque detection unit substantially provided within a predetermined space defined between the magnetic shield section and the yoke portions.

2. The torque sensor according to claim 1, wherein the magnetic shield section is formed of a magnetic material exhibiting a low coercive force characteristic.

3. The toque sensor according to claim 1, wherein
   the magnetic shield section is disposed parallel to the shaft so as to uniformly impart a magnetic effect from an outside world to the shaft.

4. The torque sensor according to claim 1, wherein the torque sensor is mounted as a sensor for detecting a torque occurring in a steering system of a vehicle having an electric power steering apparatus.

5. A magnetostriction-type torque sensor comprising:
a shaft formed of a magnetic material and provided with at least a magnetostrictive film;
an exciting coil for exciting the magnetostrictive film provided on the shaft;
a detection coil for detecting a change in a magnetic field; and
yoke portions respectively provided around outer peripheries of both the exciting coil and the detection coil;
a magnetic shield section formed of a magnetic material covering an entire torque sensor for suppressing the effect of an external magnetic field; and
a steering torque detection unit substantially provided within a predetermined space defined between the magnetic shield section and the yoke portions.

* * * * *